United States Patent
Kato et al.

(10) Patent No.: US 6,914,945 B2
(45) Date of Patent: Jul. 5, 2005

(54) CLOCK RECOVERY CIRCUIT

(75) Inventors: Hisaya Kato, Kyoto (JP); Ippei Kanno, Katano (JP); Hiroshi Azakami, Ibaraki (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 880 days.

(21) Appl. No.: 09/883,174

(22) Filed: Jun. 19, 2001

(65) Prior Publication Data

US 2001/0055349 A1 Dec. 27, 2001

(30) Foreign Application Priority Data

Jun. 20, 2000 (JP) ........................................ 2000-184138

(51) Int. Cl.[7] .............................................. H04L 27/16
(52) U.S. Cl. ........................ 375/326; 375/355; 370/503; 348/537
(58) Field of Search ................................ 375/270, 377, 375/324–327, 344, 355, 362, 371, 375, 376; 327/141, 155, 156, 161, 162, 163; 370/503, 509, 512, 514, 516, 517; 348/500, 525–537, 725, 726; 455/47, 204

(56) References Cited

U.S. PATENT DOCUMENTS 5,787,123 A * 7/1998 Okada et al. ............... 375/324
5,802,461 A * 9/1998 Gatherer ..................... 455/204
5,859,671 A * 1/1999 Kim ............................ 348/537
5,872,815 A * 2/1999 Strolle et al. ............... 375/321
6,445,423 B1 * 9/2002 Bouillet et al. ............. 348/537

FOREIGN PATENT DOCUMENTS

| JP | 63-211935 A | 9/1988 |
| JP | 63-290049 | 11/1988 |
| JP | 8-70332 A | 3/1996 |
| JP | 10-84396 | 3/1998 |
| JP | 2000-49882 A | 2/2000 |

OTHER PUBLICATIONS

Gary Sgrignoli et al., "VSB Modulation Used For Terrestrial and Cable Broadcasts", IEEE Transactions on Consumer Electronics, vol. 41, No. 3, Aug. 1995, pp. 367–382.

* cited by examiner

*Primary Examiner*—Dac V. Ha
(74) *Attorney, Agent, or Firm*—Smith Patent Office

(57) ABSTRACT

In a clock recovery circuit for DTV using a VSB modulation method, if the frequency of the symbol clock is fs, since the frequency difference between the fs/2 component signal of the VSB signal and the pilot signal is constant at fs/2, it is possible accurately to detect the phase error from their differential signal. Furthermore there is no distortion of the clock signal frequency of the VSB signal, even when the symbol data is distorted by multi-pass distortion or the like, since clock signal regeneration is performed by frequency domain processing. By employing this type of principle and performing phase error detection for each symbol at a time, it is possible to ensure a high speed tracking performance for clock signal regeneration.

9 Claims, 12 Drawing Sheets

F I G. 1 0
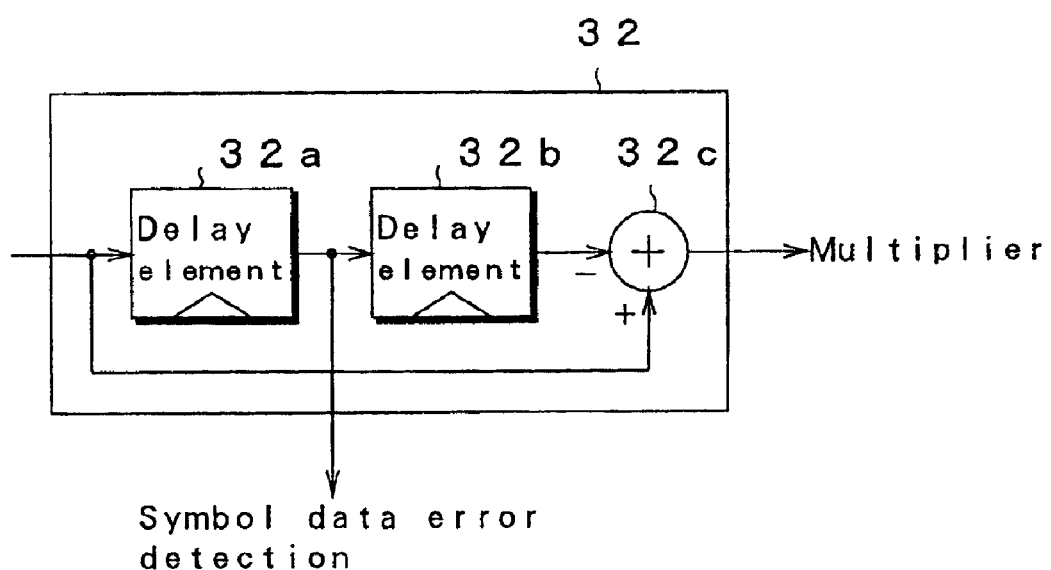

CLOCK RECOVERY CIRCUIT

BACKGROUND OF THE INVENTION

1. Field of the Invention

The present invention relates to a clock recovery circuit which is incorporated in a receiving device for digital television broadcasts using a VSB modulation method.

2. Description of the Related Art

As a clock recovery circuit according to the prior art, for example, there is a per se known type "VSB modulation used for terrestrial and cable broadcasts" described in the publication, IEEE Trans. Consumer Electronics, Vol. 41, No. 3, pp. 367–381, August 1995.

FIG. 1 is a structural view showing the above identified clock recovery circuit including A/D converter. In this clock recovery circuit, an A/D converter 1 inputs a VSB signal which has been converted to baseband, and converts it to digital data using a synchronous clock signal. A correlation filter 2 detects data breaks of fixed lengths in the data series which is inputted from the A/D converter 1. A segment integrator 3 inputs the output data from the correlation filter 2, and performs integration for each of 832 symbols. A segment detector 4 detects data segment sync which exist for each of the 832 symbols. A phase error detector 5 detects the phase error using data segment sync, and outputs a phase error signal. A loop filter 6 smoothes the phase error signal, and controls a reference clock of receiving device generator (VCXO) 7 using this phase error signal. This reference clock signal generator 7 comprises a voltage control oscillator which employs a crystal oscillator. The reference clock generator 7 generates a synchronous reference clock signal which is phase-controlled, and supplies it to the A/D converter 1 as a sampling clock signal.

In the clock recovery circuit, the phase error between the symbol clock of the received VSB signal and the reference clock of the receiving device is detected using data segment sync which exist for each of the 832 symbols. Due to this, it becomes impossible to perform high speed tracking of the synchronous clock signal when the received signal is varying over time.

Furthermore, when performing signal reception in conditions of lower C/N ratio, or when the influence of multi-pass distortion is being experienced, data segment sync undesirably becomes distorted, and correct detection of the phase error of the synchronous clock signal becomes impossible. In this case, it becomes impossible to regenerate an accurate clock signal.

SUMMARY OF THE INVENTION

The present invention has been conceived of after consideration of the above type of problematical points which the prior art involves, and it has as its objective, in order to solve the problems with prior art circuits, to implement a clock recovery circuit which can perform high speed tracking even when the received signal varies over time, by performing phase error detection for each of the symbols of the received signal individually. Moreover, it has as its further objective to implement a clock recovery circuit which can perform accurate clock signal regeneration, even during reception under low C/N ratio conditions, or when the influence of multi-pass distortion is being experienced, by performing processing in a frequency domain for phase error detection.

BRIEF DESCRIPTION OF THE DRAWINGS

FIG. 10 is a figure for explanation of the operation of a tendency detection which is utilized in the clock recovery circuit of the fourth embodiment.

DETAILED DESCRIPTION OF THE PREFERRED EMBODIMENTS

Preferred Embodiment 1

Figure 2:
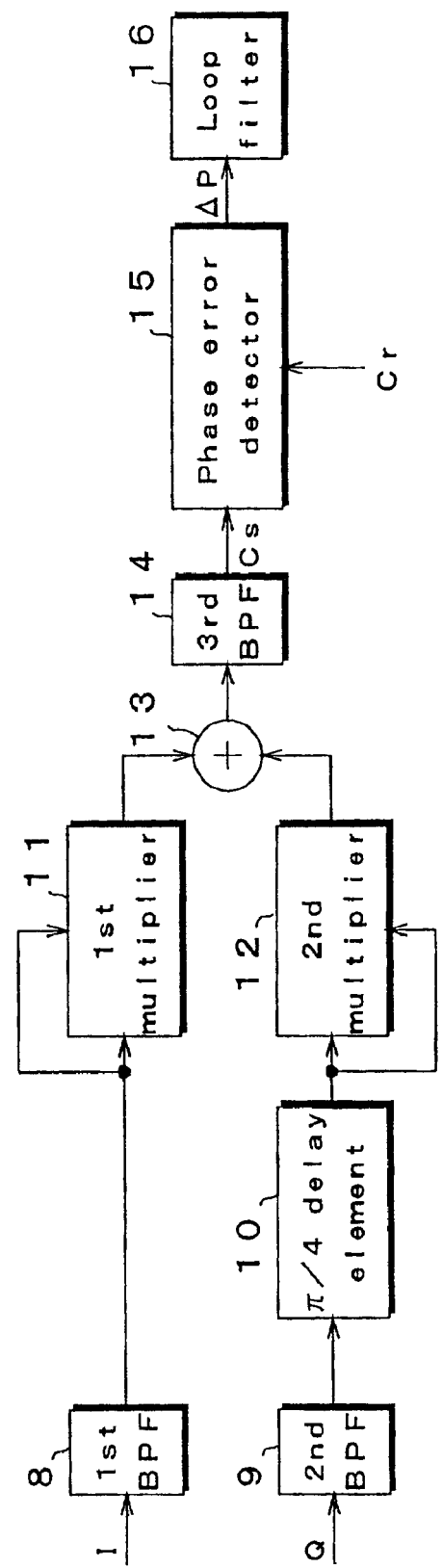
FIG. 2 is a block diagram showing the general structure of a clock recovery circuit according to a first preferred embodiment of the present invention.

Next a clock recovery circuit according to a first preferred embodiment of the present invention will be explained. FIG. 2 is a block diagram showing the general structure of this clock recovery circuit according to the first preferred embodiment. This clock recovery circuit comprises a first band pass filter (hereinafter abbreviated as "BPF") 8, a second BPF 9, a Π/4 delay element 10, a first multiplier 11, a second multiplier 12, an adder 13, a third BPF 14, a phase error detector 15, and a loop filter 16.

Let the frequency of the symbol clock (symbol rate) be termed "fs" (and its angular frequency "ωs"). The first BPF

8 is a band pass filter which extracts a signal of the fs/2 frequency component of $\cos(\omega s/2)t$ from the in-phase component of the VSB signal which has been converted to baseband. The second BPF 9 is a band pass filter which extracts a signal of the fs/2 frequency component $\sin(\omega/2)t$ from the quadrature-phase component of the VSB signal which has been converted to baseband. The $\Pi/4$ delay element 10 is a circuit which delays the phase of the output signal of the second BPF 9 by just the amount $\Pi/4$, so that this output signal becomes $\cos(\omega/2)t$. The first multiplier 11 is a circuit which squares the output signal of the first BPF 8, so that this output signal becomes $[1+\cos(\omega s)t]/2$. The second multiplier 12 is a circuit which squares the output signal $\cos(\omega s/2)t$ of the $\Pi/4$ delay element 10, so that this output signal becomes $[1+\cos(\omega s)t]/2$.

The adder 13 is a circuit which adds together the output signal $[1+\cos(\omega s)t]/2$ and the output signal of the second multiplier 12 $[1+\cos(\omega s)t]/2$, so that its output signal has the value $[1+\cos(\omega s)t]$. The third BPF 14 is a band pass filter which extracts the fs component from the added output of the adder 13, and which obtains the symbol clock Cs of the VSB signal which has been received. The phase error detector 15 is a circuit which detects the phase error between the symbol clock Cs of the received VSB signal and the reference clock Cr of the receiving device, and which generates a phase error signal $\Delta P$. And the loop filter 16 is a filter which smoothes the phase error signal $\Delta P$.

Figure 3:
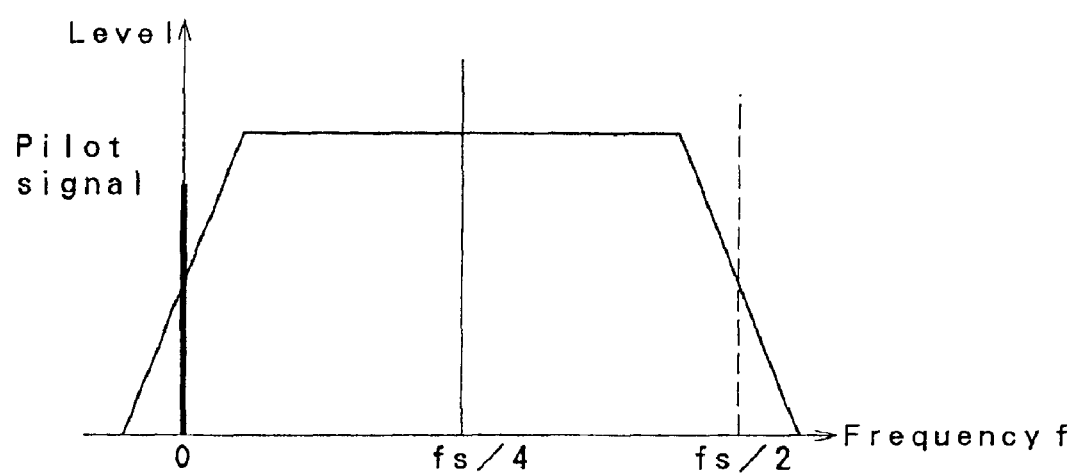
FIG. 3 is a frequency spectrum diagram of a VSB signal which has been converted to baseband, in each of the clock recovery circuits according to the various preferred embodiments of the present invention.

The operation of this clock recovery circuit with the above described structure will now be explained. First, the VSB signal which has been converted to baseband has a spectrum like the one shown in FIG. 3. In other words, a pilot of frequency fp or angular frequency $\omega s (=2\Pi fp)$ signal is present in the DC component of the frequency. If the frequency of the symbol clock which is included in the VSB signal is termed fs, then a fs/2 signal is present in a position separated by fs/2 from the pilot signal. The first BPF 8 and the second BPF 9 shown in FIG. 2 extract the signal of the fs/2 component. The first multiplier 11 squares the output signal of the first BPF 8. The $\Pi/4$ delay element 10 delays the output signal of the second BPF 9 by just $\Pi/4$ as seen from the point of view of the reference clock Cr of the receiving device. The second multiplier 12 squares the output signal of the $\Pi/4$ delay element 10. And the output signals of the first multiplier 11 and the second multiplier 12 constitute the signals of frequency fs.

Figure 1:
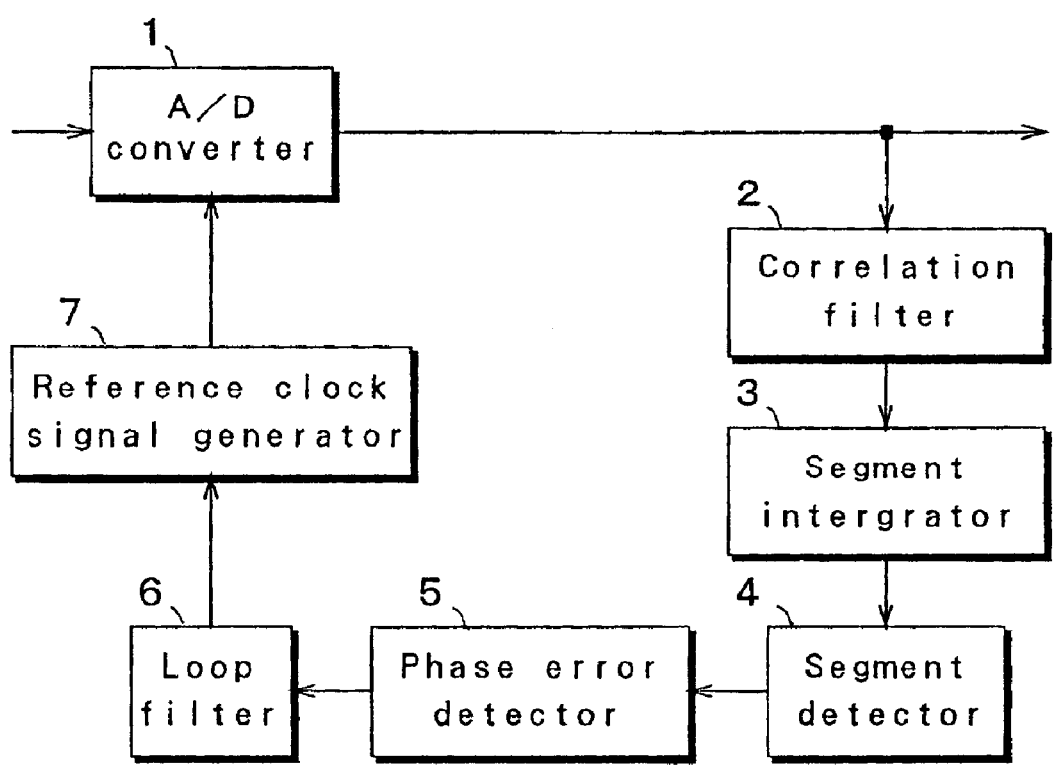
FIG. 1 is a block diagram showing the structure of a clock recovery circuit including an A/D converter, which is an example of the prior art.

The adder 13 adds together the squared in-phase component and the squared quadrature-phase component. This added signal includes the symbol clock of the VSB signal which has been received. The third BPF 14 extracts only the symbol clock component. The phase error detector 15 detects the phase error by comparing the phase of the symbol clock of the received VSB signal with the phase of the reference clock of the receiving device. The loop filter 16 smoothes the phase error signal $\Delta P$ which has been outputted from the phase error detector 15. This phase error signal $\Delta P$ is supplied, for example, as a PLL control signal to a reference clock of receiving device generation circuit, which is identical to the reference clock generator of FIG. 1. Furthermore, if no circuit like the reference clock generator 7 of FIG. 1 is used, and moreover if the A/D converter 1 samples at a clock signal from a fixed oscillator, then this phase error signal $\Delta P$ is used as information for data interpolation, so that the sampling data of the A/D converter 1 becomes sampling data at the correct phase.

Figure 4:
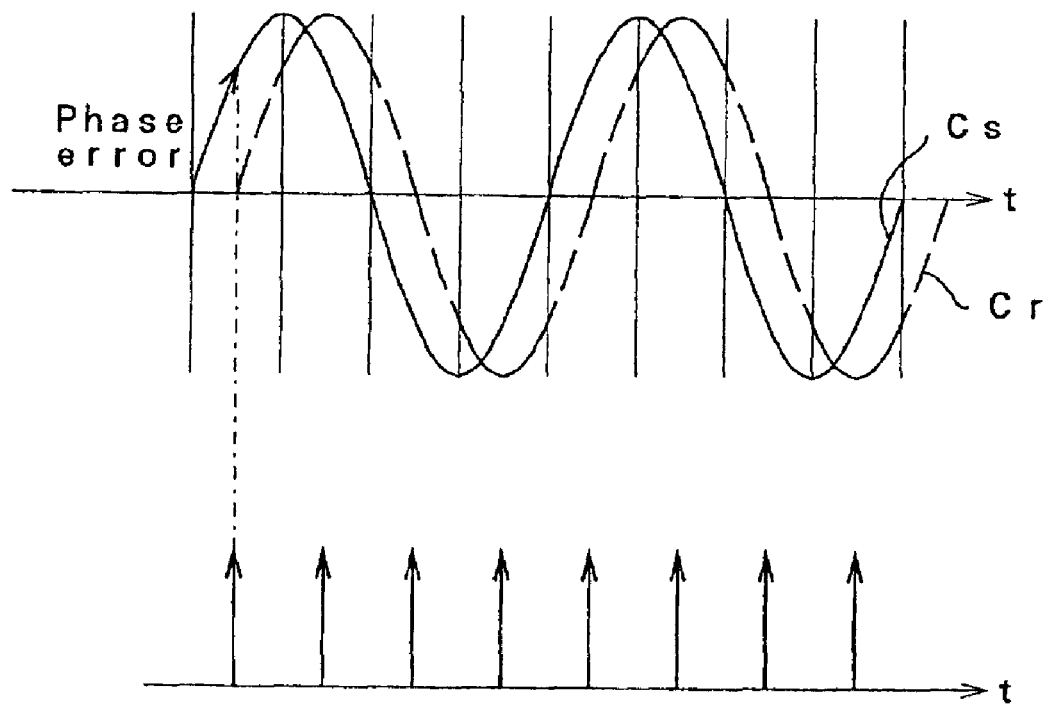
FIG. 4 is an explanatory figure showing, for the first embodiment of the clock recovery circuit, the phase error relationship between the symbol clock of the VSB signal which has been received, and the symbol clock of the receiving device.

Thus, as shown in FIG. 4, the phase error detector 15 detects the phase difference at each instant by quantizing the output signal Cs of the third BPF 14, at the reference clock Cr of the receiving device.

As described above, according to this first embodiment of the present invention, it is possible to perform clock signal regeneration by processing at the frequency domain. Due to this, it is possible to regenerate a more accurate clock signal, even if the symbol data is distorted by multi-pass distortion or the like, since there is no deviation in the frequency of the clock signal of the VSB signal. Furthermore, since both the in-phase component and the quadrature-phase component of the VSB signal are employed, the S/N ratio is enhanced, and it is possible to regenerate an accurate clock signal. Yet further, even if frequency jitter is generated in the baseband VSB signal by the carrier recovery circuit, or if frequency drift of the carrier wave included during non-coherent detection or the like occurs, it is possible to regenerate an accurate clock signal.

Although in the above described first preferred embodiment both the in-phase component and the quadrature-phase component of the VSB signal are employed, it should be noted that it would also be possible, as an alternative, to implement the clock recovery circuit so as to employ only one or the other of these two components.

Preferred Embodiment 2

Figure 5:
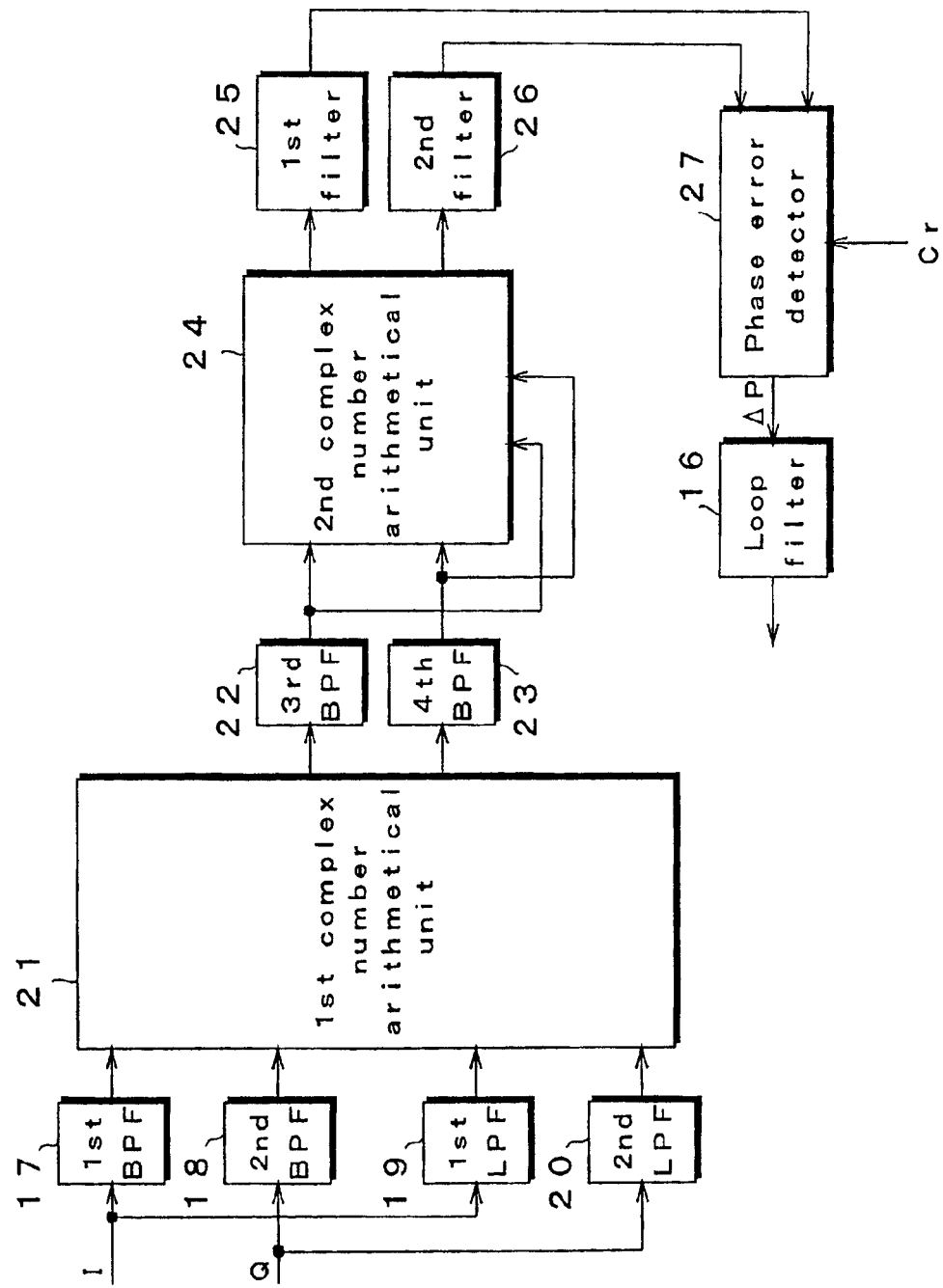
FIG. 5 is a block diagram showing the general structure of a clock recovery circuit according to a second preferred embodiment of the present invention.
Figure 6:
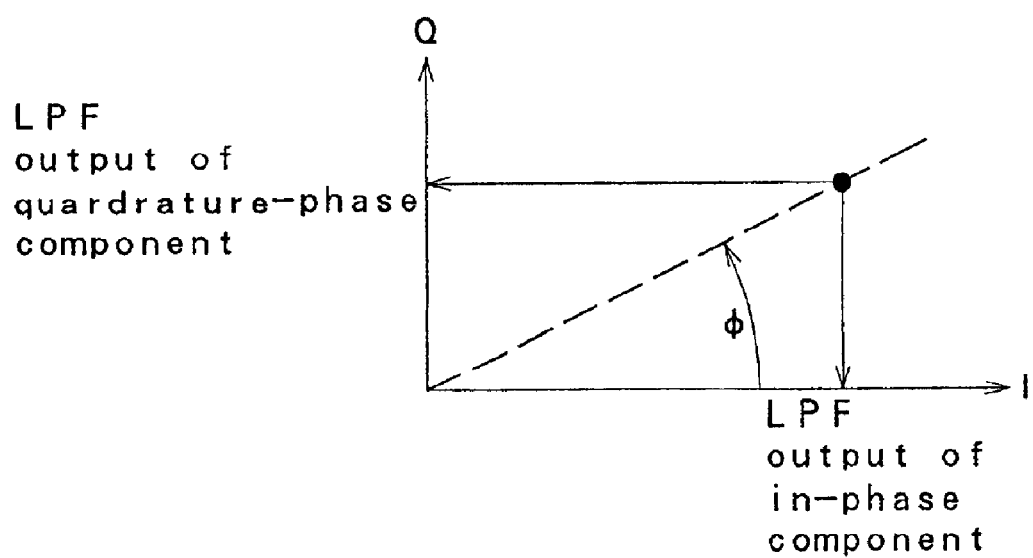
FIG. 6 is a figure for explanation of the operation of a phase error detector which is utilized in the clock recovery circuit of the second embodiment.

FIG. 5 is a block diagram showing the general structure of a clock recovery circuit according to a second preferred embodiment of the present invention. This clock recovery circuit comprises a first BPF 17, a second BPF 18, a first low pass filter (hereinafter abbreviated as "LPF") 19, a second LPF 20, a first complex number arithmetical unit 21, a third BPF 22, a fourth BPF 23, a second complex number arithmetical unit 24, a first filter 25, a second filter 26, a phase error detector 27, and a loop filter 16.

Let the frequency of the symbol clock (symbol rate) be termed "fs" (and its angular frequency "$\omega s$"). The first BPF 17 and the second BPF 18 are band pass filters which extract a signal having the fs/2 frequency component from the baseband VSB signal. Let the output of the first BPF 17 be termed the in-phase component, and the output of the second BPF 18 be termed the quadrature-phase component; then the signal made up from the in-phase component and quadrature-phase component will be termed the first complex number signal $ej(\omega p+\omega s/2)t$. It should be understood that the complex number signal $[\cos X + j \sin X]$ is written as $ejX$.

The first LPF 19 and the second LPF 20 are low pass filters which extract the pilot signal from the baseband VSB signal. Let the output of the first LPF 19 be termed the in-phase component, and the output of the second LPF 20 be termed the quadrature-phase component; then the signal which is made up from the in-phase component and the quadrature-phase component will be termed the second complex number signal $ej(\omega p)t$.

The first complex number arithmetical unit 21 is made as a complex number divider. This first complex number arithmetical unit 21 is a circuit which divides the first complex number signal by the second complex number signal, according to the rules of complex number division. It should be understood that it would also be possible, as an alternative, for this first complex number arithmetical unit 21 to operate by multiplying the first complex number signal by a complex number signal which is the conjugate of the second complex number signal.

The third BPF 22 and the fourth BPF 23 are band pass filters which extract the fs/2 component signal from the output signals of the first complex number arithmetical unit 21. Let the output of the third BPF 22 be termed the in-phase component, and the output of the fourth BPF 23 be termed the quadrature-phase component; then the signal which is made up from the in-phase component and the quadrature-phase component will be termed the third complex number signal $ej(\omega s/2)t$.

The second complex number arithmetical unit 24 is a circuit which squares this third complex number signal, so as to convert it to a signal which includes a fs component. The first filter 25 and the second filter 26 are circuits which extract a signal which consists only of the fs component from the output signal of the second complex number arithmetical unit 24. Let the output of the first filter 25 be termed the in-phase component, and the output of the second filter 26 be termed the quadrature-phase component; then the signal which is made up from the in-phase component and the quadrature-phase component will be termed the fourth complex number signal $ej(\omega s)t$.

It should be understood that, when the operating speed of the clock recovery circuit is 2fs, this first filter 25 and second filter 26 may be highpass filters which pass the fs component, and when the operating speed is greater than 2fs, they may be band pass filters which pass this fs component.

The phase error detector 27 is a circuit which detects the phase error between the symbol clock Cs which is included in the fourth complex number signal and the reference clock Cr of the receiving device, and generates a phase error signal ΔP. The loop filter 16 is a filter which smoothes the phase error signal ΔP, just like the one shown in FIG. 2.

The operation of this clock recovery circuit according to the second embodiment will now be explained. First, the VSB signal which has been converted to baseband has a spectrum like the one shown in FIG. 3, and a pilot signal is present in the DC component of the frequency. The first BPF 17 and the second BPF 18 extract the signal at the position separated by fs/2 from the pilot signal. Further, the first LPF 19 and the second LPF 20 extract the pilot signal only.

The first complex number arithmetical unit 21 performs complex number division so as to divide the complex number signal $ej(\omega p+\omega s/2)t$ of the first BPF 17 and the second BPF 18 by the complex number signal $ej(\omega p)t$ of the first LPF 19 and the second LPF 20, and extract the signal which is in the frequency fs/2 position apart from the pilot signal, in other words the signal which is the ½ frequency component of the symbol clock (fs) of the received VSB signal.

The third BPF 22 and the fourth BPF 23 allow to pass only the fs/2 signal component from the output signal of the first complex number arithmetical unit 21. The second complex number arithmetical unit 24 squares the third complex number signal, so as to convert it to a signal of which the main component is the frequency fs. The first filter 25 and the second filter 26 extract only the signal of fs from the output signal of the second complex number arithmetical unit 24.

The phase error detector 27 detects the phase error of the symbol clock of the received VSB signal by detecting the phase difference between the fourth complex number signal and the reference clock Cr. The loop filter 16 smoothes the phase error signal ΔP, and outputs a control signal of the clock signal reference circuit.

In complex number coordinates, let the output of the first LPF 25 be termed the in-phase component, and the output of the second LPF 26 be termed the quadrature-phase component. If the phase of the reference clock of the receiving device is supposed only to have an in-phase component, then the phase angle Φ which is determined by the in-phase component and the quadrature-phase component indicates the phase error of the symbol clock Cs of the VSB signal. The phase error detector 27 detects this phase error.

According to the second embodiment, when a baseband VSB signal is received, even in the case that frequency jitter is generated in the carrier recovery circuit, or if frequency drift of the carrier wave included during non-coherent detection or the like occurs, since the frequency difference between the signal of the fs/2 component of the VSB signal and the pilot signal is constant at fs/2, therefore it is possible to detect the phase error accurately from their differential signal. Further, since the clock signal regeneration is performed by processing by frequency domain, even if the symbol data is distorted by multi-pass distortion or the like, there is no deviation in the frequency of the clock signal of the VSB signal. Due to this, it is possible to regenerate a more accurate clock signal with this second preferred embodiment, than in the case of the first embodiment described above.

Moreover, although a VSB signal converted to baseband was employed with this second embodiment, it would also be possible, as an alternative, to implement this clock recovery circuit with a VSB signal outside the baseband region, for example of an intermediate frequency band or the like.

It should be understood that, with this second preferred embodiment, it would be possible to change the function of complex number division of the first complex number arithmetical unit 21 to the function of complex number multiplication, by employing the conjugate value of the output signals of the first LPF 19 and the second LPF 20.

Preferred Embodiment 3

Figure 7:
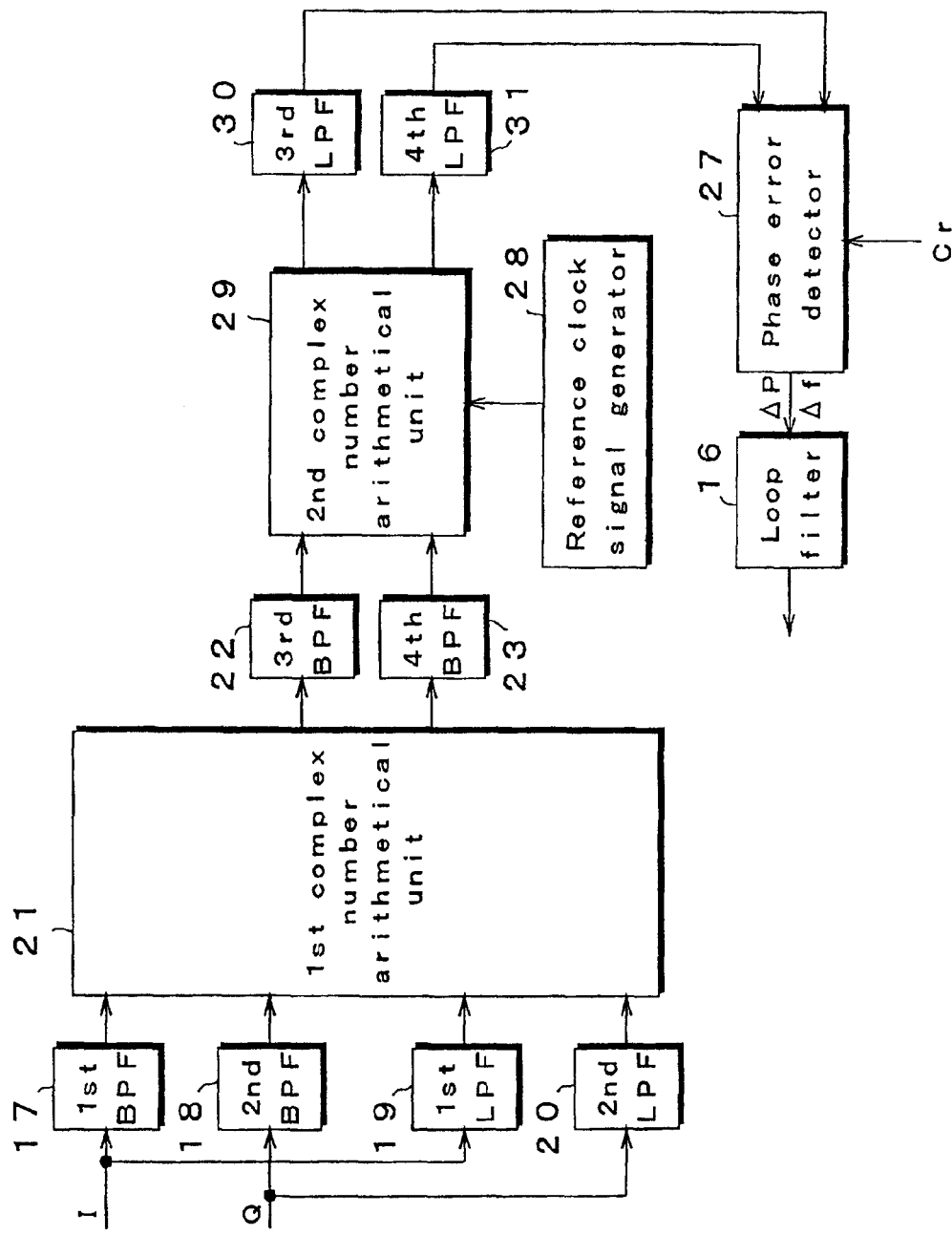
FIG. 7 is a block diagram showing the general structure of a clock recovery circuit according to a third preferred embodiment of the present invention.

FIG. 7 is a block diagram showing the general structure of a clock recovery circuit according to a third preferred embodiment of the present invention. It should be understood that elements of this third embodiment which correspond to elements of the second embodiment described above and which have the same functions are denoted by the same reference symbols, and the description of their function is omitted. This clock recovery circuit, just like the circuit of the second embodiment, comprises a first BPF 17, a second BPF 18, a first LPF 19, a second LPF 20, a first complex number arithmetical unit 21, a third BPF 22, a fourth BPF 23, a phase error detector 27, and a loop filter 16. And there are additionally provided a reference clock of receiving device generator 28, a second complex number arithmetical unit 29, a third LPF 30, and a fourth LPF 31.

Let the frequency of the reference clock of the receiving device be termed "fs'" (and its angular frequency "ωs'"). The reference clock generator 28 is a circuit which generates a reference clock of receiving device Cr of frequency fs'/2. The outputs of the third BPF 22 and the fourth BPF 23 will be termed the third complex number signal $ej(\omega s/2)t$. Furthermore, the output of the reference clock generator 28 will be termed the fourth complex number signal $ej(\omega s'/2)t$. The second complex number arithmetical unit 29 is made as a complex number divider, and it is a circuit which generates a differential signal between the symbol clock on the transmission signal and the reference clock on the receiving device by dividing the third complex number signal by the fourth complex number signal.

The third LPF 30 and the fourth LPF 31 are low pass filters which input the complex number signal which is outputted from the second complex number arithmetical unit 29 and convert it into a fifth complex number signal by extracting the signal component of frequency (fs−fs')/2. This fifth complex number signal includes the frequency error and the phase error between the symbol clock on the transmission signal and the reference clock on the receiving device. The phase error detector 27 is a circuit which compares the output signals of the third LPF 30 and fourth LPF 31, and detects the frequency error Δf and the phase error ΔP.

The operation of this clock recovery circuit with the above described structure according to the third embodiment will now be explained. As previously described, the VSB signal which has been converted to baseband has a spectrum shown in FIG. 3. In other words, a pilot signal is present in the DC component of the frequency, and, with regard to the frequency of the symbol clock (symbol rate) included in the VSB signal, a signal of frequency fs/2 is present at a position separated by fs/2 from the pilot signal. The first BPF 17 and the second BPF 18 extract the fs/2 separated signal, and output the first complex number signal ej(ωp+ωs/2)t. Further, the first LPF 19 and the second LPF 20 extract the pilot signal from the VSB signal, and output the second complex number signal ej(ωp)t.

The frequency difference between the signal of fs/2 extracted by the first BPF 17 and the second BPF 18 and the pilot signal fp extracted by the first LPF 19 and the second LPF 20 is fs/2. Accordingly, the first complex number arithmetical unit 21 outputs a signal including a signal of the fs/2 which is their frequency differential. The third BPF 22 and the fourth BPF 23 pass only the signal of fs/2 from the output signal of the first complex number arithmetical unit 21, and output the third complex number signal ej(ωs/2)t.

The second complex number arithmetical unit 29 generates a differential signal ej(ωs/2−ωs'/2)t between the symbol clock on the transmission signal and the reference clock on the receiving device by dividing the third complex number signal by a fourth complex number signal ej(ωs'/2)t which is outputted from the reference clock generator 28. The third LPF 30 and the fourth LPF 31 convert this fourth complex number signal into the fifth complex number signal which includes the frequency error Δf and the phase error ΔP between the symbol clock on the transmission signal and the reference clock on the receiving device.

The phase error detector 27 inputs the fifth complex number signal, and detects the phase error ΔP between the symbol clock of the received VSB signal and the reference clock Cr of the receiving device. And the loop filter 16 smoothes the error signal ΔP of the phase error detector 27, and outputs a control signal of the clock signal reference circuit.

Here, in the complex number plane defined by the I-axis and the Q-axis, the reference clock generator 28 generates a frequency of fs'/2 by outputting in order (I, Q) signals whose phases differ by a phase difference of Π/4 at a clock signal frequency of 2fs'. These (I, Q) signals may, for example, be simply implemented by taking the values (1,0), (0,1), (−1,0) and (0,−1) in order. If the second complex number arithmetical unit 29 is structured as a complex number multiplier, it is also acceptable, as an alternative, to multiply a signal which is the conjugate of the fourth complex number signal, by the third complex number signal. In this case, the reference clocks given to the complex number multiplier should be (1,0), (0,−1), (−1,0) and (0,1), repeatedly in this order.

According to this third preferred embodiment of the present invention as described above, when a baseband VSB signal is obtained, even in the case that frequency jitter is generated in the carrier recovery circuit, or if frequency drift of the carrier wave included during non-coherent detection occurs, since the frequency difference between the signal of the fs/2 component of the VSB signal and the pilot signal is constant at fs/2, therefore it is possible to generate an accurate clock signal from their differential signal.

Furthermore, a signal is obtained which has a low noise level, since a crystal oscillator is utilized for the reference clock generator 28 of the receiving device. By using a reference clock of receiving device of a signal generator 28 of this type, it is possible to generate an error signal whose S/N ratio is high. Yet further, since the clock signal regeneration is performed by processing by frequency domain, even if the symbol data is distorted by multi-pass distortion or the like, there is no distortion in the frequency of the clock signal of the VSB signal. Due to this, it is possible to regenerate an accurate clock signal.

Moreover, although a VSB signal converted to baseband was employed with this third embodiment of the present invention, it would also be possible, as an alternative, to implement this clock recovery circuit with a VSB signal outside the baseband region, for example with one of an intermediate frequency band or the like.

It should be understood that, with this third preferred embodiment as well, it would be possible to change the function of complex number division in the first complex number arithmetical unit 21 to the function of complex number multiplication, by employing the conjugate component of the output signals of the first LPF 19 and the second LPF 20.

Preferred Embodiment 4

Figure 8:
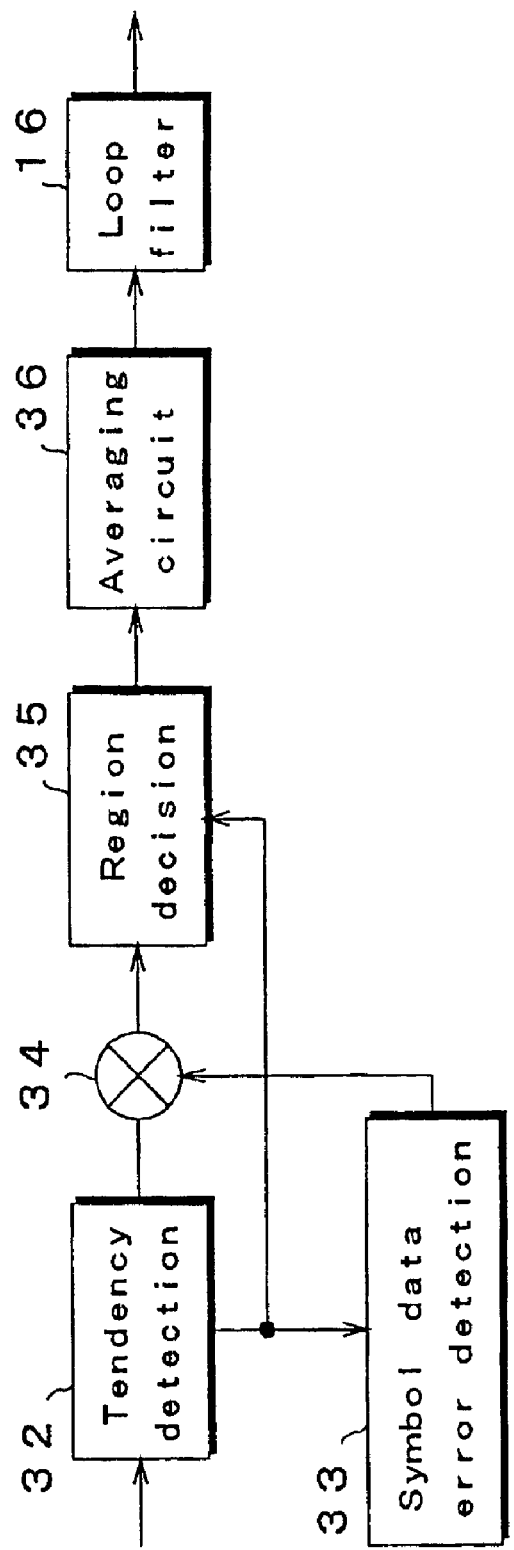
FIG. 8 is a block diagram showing the general structure of a clock recovery circuit according to a fourth preferred embodiment of the present invention.

FIG. 8 is a block diagram showing the general structure of a clock recovery circuit according to a fourth preferred embodiment of the present invention. This clock recovery circuit comprises a tendency detection 32, a symbol data error detection 33, a multiplier 34, a region decision 35, an averaging circuit 36, and a loop filter 16.

Let three successive symbol data in time series sequence in the VSB signal be D1, D2, and D3. The tendency detection 32 is a circuit which detects the tendency of the symbol data from D1 through to D3 by the amount of change in the value of symbol data. The value of symbol data error detection 33 is a circuit which detects the amount of deviation of the proper symbol data (the proper mapping value) from the symbol data D2 which have actually been received. And the multiplier 34 is a circuit which multiplies together the output signal of the tendency detection 32 and the output signal of the value of symbol data error detection 33.

The region decision 35 makes a decision as to whether the presently received symbol is present in a data update region, or whether it is present in a data holding region, based upon the value of symbol data of D2. This region decision 35 performs control so as to output the result of multiplication by the multiplier 34 if the received symbol in fact is present in the data update region, and so as not to output the result of multiplication by the multiplier 34 if the received symbol is in fact not present in the data update region. The averaging circuit 36 is a circuit which averages the output signal which has been updated by the region decision 35 each time a certain number of cycles has elapsed, and generates a phase error signal ΔP. And the loop filter 16 is a filter which smoothes this phase error signal ΔP.

Figure 9A:
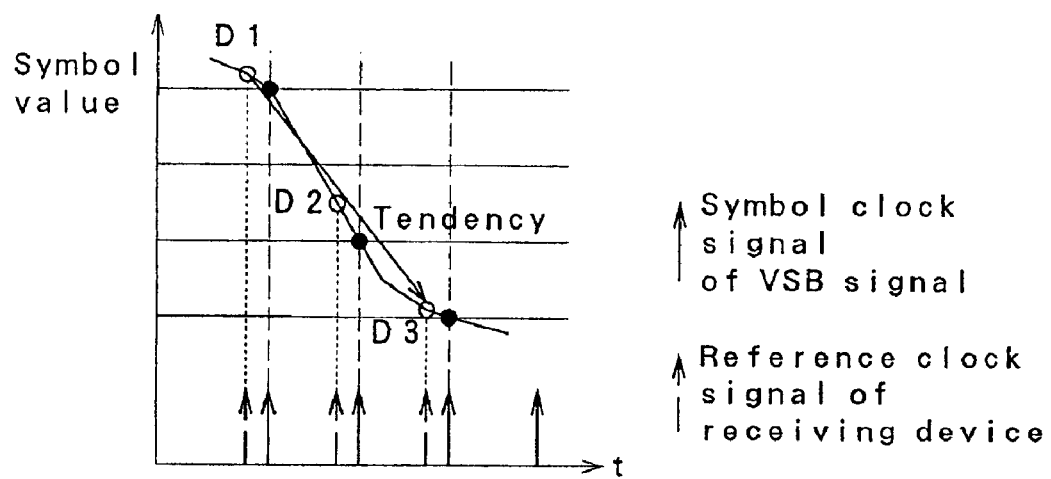
FIG. 9A is a figure for explanation of the behavior of the phase error signal, when in the operation of the fourth embodiment the received symbol value diminishes as the phase of the reference clock of the receiving device becomes advanced.
Figure 9B:
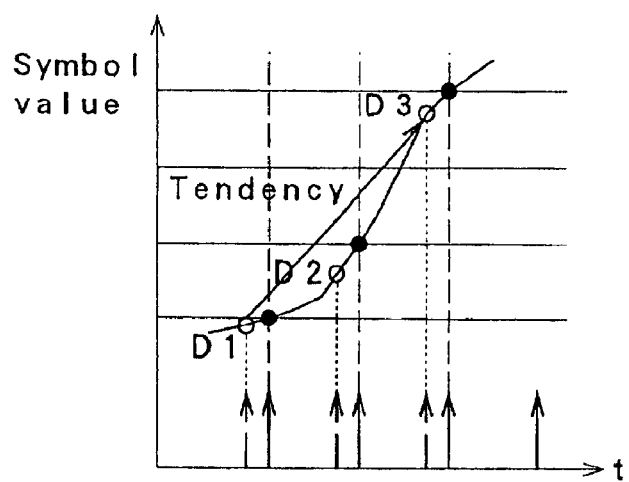
FIG. 9B is a figure for explanation of the behavior of the phase error signal, when in the operation of the fourth embodiment the received symbol value increases as the phase of the reference clock of the receiving device becomes more advanced.

The operation of this clock recovery circuit with the above described structure according to the fourth preferred embodiment will now be explained. It will be supposed that the subject symbol data D1, D2, and D3 which have been sequentially converted to baseband are either monotonically decreasing or monotonically increasing. First, as shown in FIG. 9A and FIG. 9B, the case in which the phase of the sampling by the receiving device has become more advanced will be considered. When as shown in FIG. 9A the tendency from D1 to D3 is negative, then the symbol points of the receiving device shown by ○ are larger values (more positive) than the proper symbol points shown by ●. On the other hand, when as shown in FIG. 9B the tendency from D1 to D3 is positive, then the symbol points of the receiving device are smaller values (more negative) than the proper symbol points. Whichever of these may be the case, when the tendency from D1 to D3 is multiplied by the error from the proper symbol points, the result is a negative value.

Figure 9C:
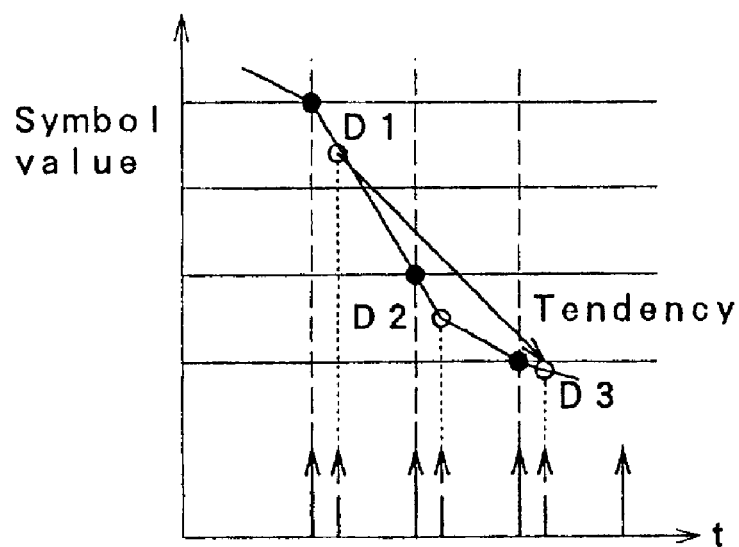
FIG. 9C is a figure for explanation of the behavior of the phase error signal, when in the operation of the fourth embodiment the received symbol value diminishes as the phase of the reference clock of the receiving device becomes more delayed.
Figure 9D:
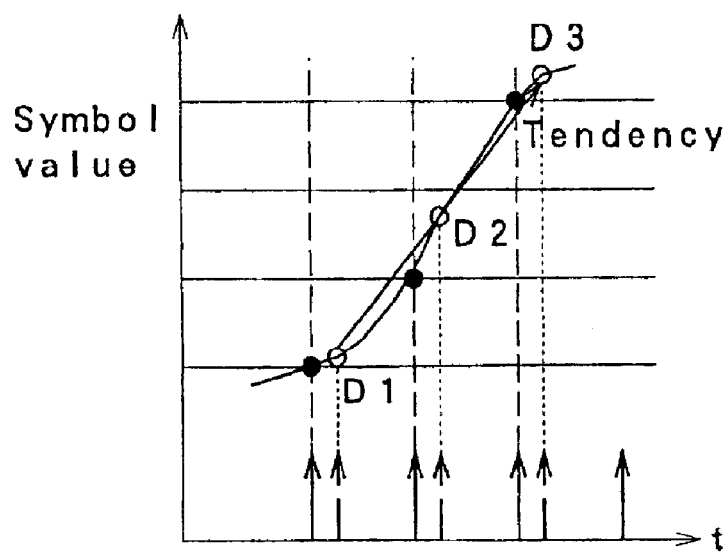
FIG. 9D is a figure for explanation of the behavior of the phase error signal, when in the operation of the fourth embodiment the received symbol value increases as the phase of the reference clock of the receiving device becomes delayed.

Next, as shown in FIG. 9C and FIG. 9D, the case in which the phase of the sampling by the receiving device has become more delayed will be considered. When as shown in FIG. 9C the tendency from D1 to D3 is negative, then the symbol points of the receiving device are smaller values (more negative) than the proper symbol points. On the other hand, when as shown in FIG. 9D the tendency from D1 to D3 is positive, then the symbol points of the receiving device are greater values (more positive) than the proper symbol points. Whichever of these may be the case, when the tendency from D1 to D3 is multiplied by the error from the proper symbol points, the result is a positive value.

In this manner, by multiplying together the output of the tendency detection 32 and the output of the value of symbol data error detection 33 with the multiplier 34, it is possible to detect the phase error ΔP between the symbol clock Cs of the received VSB signal and the reference clock Cr of the receiving device. And the region decision 35 outputs the phase error signal which is output from the multiplier 34 to the averaging circuit 36, based upon the symbol data of D2. The averaging circuit 36 averages n output signals which have been updated by the region decision 35 (where n is an integer greater than or equal to 1), and supplies the result to the loop filter 16. The loop filter 16 smoothes the error signal ΔP, and generates a control signal of the clock recovery circuit.

Figure 11:
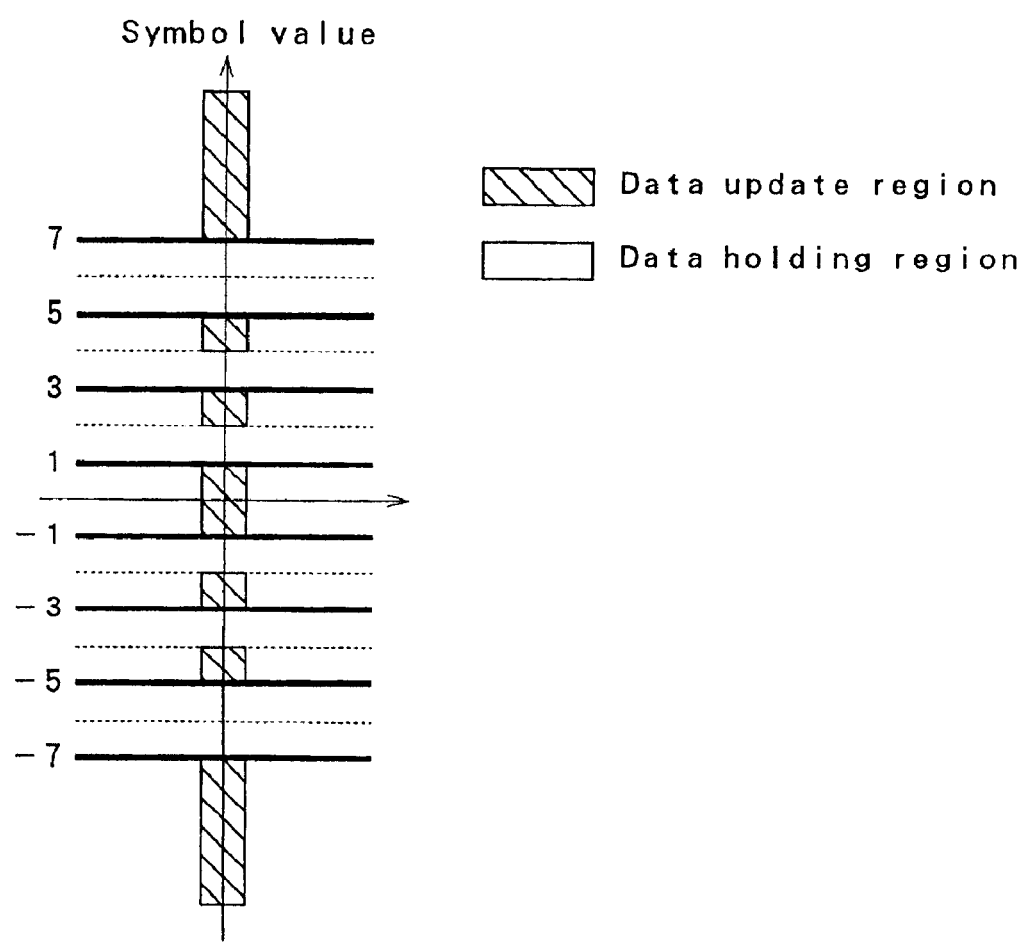
FIG. 11 is a figure for explanation of the operation of a region decision which is utilized in the clock recovery circuit of the fourth embodiment.

An example of a construction for the tendency detection 32 is shown in FIG. 10. This tendency detection 32 comprises two delay elements 32a and 32b which delay by just one symbol rate, and a subtracter 32c. FIG. 11 is an amplitude diagram which shows symbols of 8 values with the 8-VSB modulation method which is utilized for digital signal transmission in the USA. The region decision 35 of FIG. 8 outputs the phase error signal which is the output of the multiplier 34 to the averaging circuit 36 only when the symbol data of D2 are present in the data update region shown by the sloping line portions in FIG. 11. This type of method of setting the data update region is termed a "stop and Go" algorithm.

In this manner, according to this fourth preferred embodiment, it is possible to detect the phase error between the symbol clock of the received VSB signal and the symbol clock of the receiving device by utilizing an extremely simple circuit structure. Furthermore, it is possible to regenerate an accurate clock signal even during reception in low S/N ratio conditions, since the region decision and the averaging processing are used in the updating of the phase error data.

It should be understood that, although in this fourth embodiment tendency detection 32 employed the symbol data D1 and D3, it would also be possible, as an alternative, to detect the tendency by employing sampling data between the data D1 and D2, and sampling data between the data D3 and D2.

In this manner, according to the present invention, the benefit is obtained that, by performing phase error detection for each symbol, it is possible to perform tracking at high speed even when the received signal is varying over time. Furthermore, since processing by frequency domain is utilized for the phase error detection, the particular benefit is obtained that the operation of regeneration of the clock signal experiences no influence even during reception in low S/N ratio conditions, or when reception is subject to multipass distortion.

What we claim is:

1. A clock recovery circuit provided to a receiving device which receives digital broadcasts using a vestigial sideband (VSB) modulation method, comprising:

a first band pass filter which, when a symbol rate of a received signal is fs, extracts a signal of an fs/2 frequency component from an in-phase component of a VSB signal which has been converted to baseband;

a second band pass filter which extracts a signal of an fs/2 frequency component from a quadrature-phase component of said VSB signal;

a delay element which delays an output signal of said second band pass filter by Π/4;

a first multiplier which squares an output signal of said first band pass filter;

a second multiplier which squares an output signal of said delay element;

an adder which adds together an output signal of said first multiplier and an output signal of said second multiplier;

a third band pass filter which extracts a signal of an fs frequency component from an output signal of said adder, and outputs a symbol clock received signal;

a phase error detector which detects a phase error between the symbol clock received signal of said third band pass filter and a reference clock of the receiving device; and a loop filter which smoothes a phase error signal which is outputted by said phase error detector.

2. A clock recovery circuit provided to a receiving device which receives digital broadcasts using a vestigial sideband (VSB) modulation method, comprising:

a first band pass filter which, when a symbol rate of a received signal is fs, extracts a signal of an fs/2 frequency component from an in-phase component of a VSB signal which has been converted to baseband;

a second band pass filter which extracts a signal of an fs/2 frequency component from a quadrature-phase component of said VSB signal;

a first low pass filter which extracts a pilot signal from said in-phase component of said VSB signal which has been converted to baseband;

a second low pass filter which extracts a pilot signal from said quadrature-phase component of said VSB signal which has been converted to baseband;

a first complex number arithmetical unit which, when output signals of said first and said second band pass filters are considered as a first complex number signal, and output signals of said first and said low pass filters are considered as a second complex number signal, divides said first complex number signal by said second complex number signal according to the rules for complex number division;

a third band pass filter which extracts a signal of an fs/2 frequency component from an in-phase component of an output signal of said first complex number arithmetical unit;

a fourth band pass filter which extracts a signal of an fs/2 frequency component from a quadrature-phase component of the output signal of said first complex number arithmetical unit;

a second complex number arithmetical unit which, when output signals of said third and said fourth band pass filters are considered as a third complex number signal, squares said third complex number signal;

a first filter which extracts an in-phase component signal which has frequency fs from an output signal of said second complex number arithmetical unit;

a second filter which extracts a quadrature-phase component signal which has frequency fs from the output signal of said second complex number arithmetical unit;

a phase error detector which, when the output signals of said first and said second filters are considered as a fourth complex number signal, detects a phase error between a symbol clock received signal included in said fourth complex number signal and a reference clock of the receiving device; and a loop filter which smoothes a phase error signal which is outputted by said phase error detector.

3. A clock recovery circuit according to claim 2, wherein said first and said second filters are high pass filters which pass an fs component when an operating speed of said clock recovery circuit is 2fs, and are band pass filters when the operating speed of said clock recovery circuit is greater than 2fs.

4. A clock recovery circuit provided to a receiving device which receives digital broadcasts using a vestigial sideband (VSB) modulation method, comprising:

a first band pass filter which, when a symbol rate of a received signal is fs, extracts a signal of an fs/2 frequency component from an in-phase component of a VSB signal which has been converted to baseband;

a second band pass filter which extracts a signal of an fs/2 frequency component from a quadrature-phase component of said VSB signal;

a first low pass filter which extracts a pilot signal from said in-phase component of said VSB signal which has been converted to baseband;

a second low pass filter which extracts a pilot signal from said quadrature-phase component of said VSB signal which has been converted to baseband;

a first complex number arithmetical unit which, when the output signals of said first and said second band pass filters are considered as a first complex number signal, and output signals of said first and said low pass filters are considered as a second complex number signal, divides said first complex number signal by said second complex number signal according to rules for complex number division;

a third band pass filter which extracts a signal of the fs/2 frequency component from an in-phase component of an output signal of said first complex number arithmetical unit;

a fourth band pass filter which extracts a signal of the fs/2 frequency component from a quadrature-phase component of said output signal of said first complex number arithmetical unit;

a reference clock of receiving device generator which, with a reference clock of receiving device frequency on a complex number plane being taken as fs', outputs a reference clock of receiving device having a frequency of fs'/2 as a fourth complex number signal;

a second complex number arithmetical unit which, when output signals of said third and said fourth band pass filters are considered as a third complex number signal, divides said third complex number signal by said fourth complex number signal according to said rules for complex number division;

a third low pass filter which extracts only an in-phase component which has frequency (fs−fs')/2 from an output signal of said second complex number arithmetical unit;

a fourth low pass filter which extracts only a quadrature-phase component which has frequency (fs−fs')/2 from the output signal of said second complex number arithmetical unit;

a phase error detector which, when an output signals of said third and fourth low pass filters are considered as a fifth complex number signal, outputs a frequency of said fifth complex number signal as a frequency error of a symbol clock, and outputs a phase of said fifth complex number signal as a phase error of the symbol clock; and a loop filter which smoothes a phase error signal which is outputted by said phase error detector.

5. A clock recovery circuit according to claim 4, wherein, in a complex number plane defined by an I-axis and a Q-axis, the reference clock signal generator outputs in order (I, Q) signals whose phase differs by a phase difference of Π/4 at a clock signal frequency of 2fs'.

6. A clock recovery circuit provided to a receiving device which receives digital broadcasts using a vestigial sideband (VSB) modulation method, comprising:

a tendency detection section which, when successive symbol data in time series in a VSB signal which has been converted to baseband are termed D1, D2, and D3, detects a tendency from D1 to D3 by a value of symbol data amount of change;

a symbol data error detection section which detects an amount of deviation of a D2 symbol value with respect to a proper symbol data (the proper mapping value);

a multiplier which multiplies together an output value of said tendency detection section and an output value of said symbol data error detection section;

a region decision section which, based upon a symbol value of D2, decides whether a currently received symbol is present in a data update region or is present in a data holding region, and which performs control so as, if said currently received symbol is present in said data update region, to output a result of multiplication by said multiplier, while, if said currently received symbol is present in said data holding region, not to output said result of multiplication by said multiplier;

an averaging circuit which averages the output signal of said region decision section once every predetermined number of times; and a loop filter which smoothes a phase error signal which is outputted by said averaging circuit.

7. A clock recovery circuit according to claim 6, wherein said tendency detection section subtracts D3 from D1, and detects said tendency by whether the subtraction result is positive or negative.

8. A clock recovery circuit according to claim 6, wherein said symbol data error detection section detects a symbol value error by subtracting a proper mapping value from D2.

9. A clock recovery circuit according to claim 6, wherein said region decision section performs region decision based upon a "Stop and Go" algorithm.

* * * * *